United States Patent
Messner (10) Patent No.: US 10,239,704 B2
(45) Date of Patent: Mar. 26, 2019

(54) METHOD AND CONVEYING TECHNOLOGY ELEMENT FOR COMBINING CONVEYOR STREAMS IN A CONVEYOR SYSTEM

(71) Applicant: TGW Logistics Group GmbH, Marchtrenk (AT)

(72) Inventor: Gerhard Messner, Linz (AT)

(73) Assignee: TGW Logistics Group GmbH, Marchtrenk (AT)

( * ) Notice: Subject to any disclaimer, the term of this patent is extended or adjusted under 35 U.S.C. 154(b) by 0 days.

(21) Appl. No.: 15/321,806

(22) PCT Filed: Jun. 24, 2015

(86) PCT No.: PCT/AT2015/050157
§ 371 (c)(1),
(2) Date: Dec. 23, 2016

(87) PCT Pub. No.: WO2015/196226
PCT Pub. Date: Dec. 30, 2015

(65) Prior Publication Data
US 2017/0137232 A1    May 18, 2017

(30) Foreign Application Priority Data

Jun. 24, 2014    (AT) .............................. A 50439/2014

(51) Int. Cl.
*B65G 1/04*    (2006.01)
*B65G 47/70*    (2006.01)
(Continued)

(52) U.S. Cl.
CPC ........... *B65G 47/70* (2013.01); *B65G 1/0492* (2013.01); *B65G 1/1373* (2013.01); *B65G 47/681* (2013.01)

(58) Field of Classification Search
CPC .... B65G 47/681; B65G 47/70; B65G 1/1373; B65G 1/1378
(Continued)

(56) References Cited

U.S. PATENT DOCUMENTS 2,304,447 A * 12/1942 Feusler ................ B65G 47/681
198/357
2,441,469 A *  5/1948 Cameron ............. B65G 47/681
198/524

(Continued)

FOREIGN PATENT DOCUMENTS

DE    29 602 108 U1    3/1996
DE    297 24 039 U1    9/1999
(Continued)

OTHER PUBLICATIONS

International Search Report of PCT/AT2015/050157, dated Oct. 22, 2015.

(Continued)

*Primary Examiner* — William R Harp
(74) *Attorney, Agent, or Firm* — Collard & Roe, P.C.

(57) ABSTRACT

A method combines conveyor streams on a conveying technology element having a number of ingoing conveyor segments at least one coupling to an outgoing conveyor segment on which the ingoing conveyor segments are brought together, and a number of holding devices for holding a conveyor flow on the ingoing conveyor segments. In addition, a number of release devices disposed downstream of the ingoing conveyor segments logically connected to an OR-connection are provided for releasing a holding device or a conveyed object. A holding device or a conveyed object waiting at the holding device is then respectively released when a conveyed object preceding the waiting conveyed object in a sorting order passes one of the connected release devices or when there is no preceding (Continued)

conveyed object. A conveying technology element carries out the method.

21 Claims, 8 Drawing Sheets

(51) Int. Cl.
*B65G 1/137* (2006.01)
*B65G 47/68* (2006.01)

(58) Field of Classification Search
USPC .............................. 198/444, 451, 357, 363
See application file for complete search history.

(56) References Cited

U.S. PATENT DOCUMENTS

| | | | | |
|---|---|---|---|---|
| 2,880,891 | A * | 4/1959 | Carroll | B65G 43/08 198/349.9 |
| 3,173,557 | A | 3/1965 | Eliassen | |
| 3,223,225 | A * | 12/1965 | Clark | B65G 47/681 198/357 |
| 3,259,240 | A | 7/1966 | Schneider | |
| 3,270,861 | A * | 9/1966 | Reed | B65G 17/24 198/598 |
| 3,747,781 | A * | 7/1973 | Daigle | B65G 47/00 198/357 |
| 4,249,661 | A * | 2/1981 | Lem | B65G 47/54 198/367 |
| 5,230,206 | A | 7/1993 | Christ | |
| 5,237,510 | A | 8/1993 | Kakizawa et al. | |
| 5,669,748 | A | 9/1997 | Knudsen, Jr. | |
| 5,678,680 | A * | 10/1997 | Wellinger | B65G 1/137 198/418.2 |
| 5,971,131 | A | 10/1999 | Blattner et al. | |
| 7,261,509 | B2 | 8/2007 | Freudelsperger | |
| 9,205,981 | B2 | 12/2015 | Valentin | |
| 2005/0241910 | A1 | 11/2005 | Affaticati et al. | |
| 2007/0129843 | A1 | 6/2007 | Lupton et al. | |
| 2011/0048894 | A1 | 3/2011 | Doane | |

FOREIGN PATENT DOCUMENTS

| | | |
|---|---|---|
| DE | 299 12 230 U1 | 11/1999 |
| DE | 101 36 354 A1 | 2/2003 |
| DE | 20 2004 007 004 U1 | 7/2004 |
| EP | 0 457 158 A1 | 11/1991 |
| EP | 0 765 826 A1 | 4/1997 |
| EP | 0 860 382 A1 | 8/1998 |
| EP | 1 228 986 A1 | 8/2002 |
| EP | 1 964 792 B1 | 9/2008 |
| EP | 2 485 970 B1 | 3/2014 |
| EP | 2 655 221 B1 | 2/2015 |
| GB | 961 044 A | 6/1964 |
| JP | H03-272907 A | 12/1991 |
| JP | H05-132133 A | 5/1993 |
| JP | 10-59533 A | 3/1998 |
| JP | 2000-118639 A | 4/2000 |
| JP | 2001-012119 A | 1/2001 |
| JP | 2003-012119 A | 1/2003 |
| JP | 2009-227443 A | 10/2009 |
| WO | 96/19400 A1 | 6/1996 |
| WO | 99/67159 A1 | 12/1999 |
| WO | 2013/150080 A1 | 10/2013 |

OTHER PUBLICATIONS

Artikel "Shuttles und Lift verdoppeln Kapazität" (Fachzeitschrift "Lager und Fördertechnik") vom Jun. 2004—Article "Shuttles and lift double capacity" (trade journal "Lager und Fördertechnik") from Jun. 2004, article excerpt with English translation.
Kartons (Fachzeitschrift "Produkte") vom Jan. 2014—Article "New, fast system for the storage and provision of standard containers or cartons" (Trade Journal "Products") of Jan. 2014, article excerpt with English translation.
Artikel "Größter Auftrag" (Fachzeitschrift "Factory" Nr 9) vom Sep. 2006—Article "Largest order" (trade magazine "Factory" No. 9) of Sep. 2006, article excerpt with English translation.
Dokumentation "Pflichtenheft" (Knapp Logistik Automation) vom Dec. 21, 2005—Documentation "Dossier" (Knapp Logistics Automation) from Dec. 21, 2005, article excerpt with English translation.
Lastenheft der Ausschreibung der Firma Müller vom Feb. 25, 2005—Specification of the tender of the company Müller from Feb. 25, 2005, article excerpt with English translation.
Article "Vielseitige Fördertechnik für Kommissionier- und Verteilzentren" (Fachzeitschrift "MM Intralogistics Journal") from 2005.
Artikel "Shuttles und Lift verdoppeln Kapazität" (Fachzeitschrift "Lager und Fördertechnik") vom Jun. 2004—Article "Shuttles and lift double capacity" (trade journal "Lager und Fördertechnik") from Jun. 2004 (with English translation of relevant parts).
Artikel "Neues, schnelles System zur Lagerung und Bereitstellung von Standardbehältern bzw. Kartons" (Fachzeitschrift "Produkte") vom Jan. 2014—Article "New, fast system for the storage and provision of standard containers or cartons" (Trade Journal "Products") of Jan. 2014 (with English translation of relevant parts).
Article "Vielseitige Fördertechnik für Kommissionier-und Verteilzentren" (Fachzeitschrift "MM Intralogistics Journal") from 2005 (in German and English).
Artikel "Größter Auftrag" (Fachzeitschrift "Factory" Nr 9) vom Sep. 2006—Article "Largest order" (trade magazine "Factory" No. 9) of Sep. 2006 (with English translation of relevant parts).
Foto der OSR Anlage bei Firma John Lewis—Photo of the OSR plant at company John Lewis entered into opposition by Knapp on Jan. 25, 2013.
Foto des Auslagerpuffers der OSR Anlage bei Firma John Lewis—Photo of the storage buffer of the OSR system at company John Lewis entered into opposition by Knapp on Jan. 25, 2013.
Foto der Ebenenregalbediengeräte der OSR Anlage bei Firma John Lewis—Photo of the level shelf units of the OSR system at company John Lewis entered into opposition by Knapp on Jan. 25, 2013.
Foto der Auslagerpufferbahnen der OSR Anlage bei Firma John Lewis—Photo of the storage buffer runs of the OSR system at company John Lewis entered into opposition by Knapp on Jan. 25, 2013.
Documentation "4.5 Depatch—Shop orders" (Knapp Logistik Automation) dated Aug. 10, 2006 (in English).
Dokumentation "Pflichtenheft" (Knapp Logistik Automation) vom Dec. 21, 2005—Documentation "Dossier" (Knapp Logistics Automation) from Dec. 21, 2005 (with English translation of relevant parts).
Lastenheft der Ausschreibung der Firma Müller vom Feb. 25, 2005—Specification of the tender of the company Müller from Feb. 25, 2005 (with English translation of relevant parts).
Layout of "OSR Systems" dated Aug. 10, 2006.

* cited by examiner

| No. | OK | 4a | 4b |
|---|---|---|---|
| 1 | ✖ | | |
| 2 | | ● | |
| 3 | ✖ | | |
| 4 | ✖ | | |
| 5 | ✖ | | |
| 6 | | | ● |

Fig. 4

| No. | OK | 4a | 4b |
|---|---|---|---|
| 1 | ✓ | | |
| 2 | | ● | |
| 3 | ✗ | | |
| 4 | ✗ | | |
| 5 | ✗ | | |
| 6 | | | ● |

Fig. 5

| No. | OK | 4a | 4b |
|---|---|---|---|
| 1 | ✓ | | |
| 2 | ✗ | | |
| 3 | ✗ | | |
| 4 | | ● | |
| 5 | ✗ | | |
| 6 | | | ● |

Fig. 15 ively technology element for the purposes of the invention only when it brings conveyor streams together.
METHOD AND CONVEYING TECHNOLOGY ELEMENT FOR COMBINING CONVEYOR STREAMS IN A CONVEYOR SYSTEM

CROSS REFERENCE TO RELATED APPLICATIONS

This application is the National Stage of PCT/AT2015/050157 filed on Jun. 24, 2015, which claims priority under 35 U.S.C. § 119 of Austrian Application No. A 50439/2014 filed on Jun. 24, 2014, the disclosure of which is incorporated by reference. The international application under PCT article 21(2) was not published in English.

BACKGROUND OF THE INVENTION

1. Field of the Invention

The invention relates to a method for combining conveyor streams on a conveying technology element having a number of ingoing conveyor segments, at least one coupling to an outgoing conveyor segment on which the ingoing conveyor segments are brought together, and a number of holding devices for holding a conveyor flow on the ingoing conveyor segments. The invention further relates to a conveying technology element for combining conveyor streams comprising a number of ingoing conveyor segments, at least one coupling for an outgoing conveyor segment on which the ingoing conveyor segments are brought together, and a number of holding devices for holding a conveyor flow on the ingoing conveyor segments, Finally, the invention also relates to a conveyor system having a number of such conveying technology elements, in which at least one coupling for an outgoing conveyor segment of one conveying technology element is directly or indirectly connected to an ingoing conveyor segment of another conveying technology element.

2. Description of the Related Art

A method, a conveying technology element and a conveyor system of said type are basically known. On this basis, a number of ingoing conveyor streams are held on a conveying technology element when necessary and forwarded to one or more outgoing conveyor streams in order to direct conveyed objects in a specified manner to one or more destinations. As a rule, a higher-ranking controller manages a series of picking orders and activates the elements of the conveyor system so that the conveyed objects assigned to a destination (e.g. a picking work station) are taken out of a store and transported to said destination, in particular in a predefined series or sequence. To this end, sensors are provided along the conveyor line, which log the passing conveyed objects and notify the higher-ranking controller so that the latter has information about which conveyed object is where at any one time and how the conveyor system should be activated on this basis. Especially in situations where there is a large number of destinations to be supplied and many types of objects to be transported, the result is a complex task in control terms, which makes operation and in particular activation of a conveyor system difficult.

Based on a simple embodiment of such a controller, a conveyed object passing such a sensor can initiate ("trigger") the release of the ingoing conveyor stream on a conveying technology element. However, this simplified method results in only a modest rate of throughput through the conveyor system and hence to only a small number of orders handled per unit of time.

SUMMARY OF THE INVENTION

Accordingly, one objective of the invention is to propose an improved method and an improved conveying technology element for combining conveyor streams. In particular, the complexity of a controller for a conveyor system should be reduced and/or the rate of throughput through it increased.

The objective of the invention is achieved by means of a method of the type outlined above, whereby a number of release devices disposed downstream of said ingoing conveyor segments and logically connected to an OR-connection are used to release a holding device or a conveyed object, and a holding device or a conveyed object waiting at same is released when a conveyed object preceding the waiting conveyed object in a sorting order passes one of the connected release devices or when there is no preceding conveyed object.

The objective of the invention is also achieved by means of a conveying technology element of the type outlined above, comprising
 a number of release devices disposed downstream of said ingoing conveyor segments and
 a controller having a number of inputs logically connected to an OR-connection and on the input side connected to said release device and on the output side connected to said holding devices, and the controller is configured to release a holding device or a conveyed object waiting at same when a conveyed object preceding said conveyed object in a sorting order passes one of said release devices or when there is no preceding conveyed object.

Finally, the objective of the invention is also achieved by means of a conveyor system having a number of conveying technology elements of the type outlined above, and at least one coupling for an outgoing conveyor segment of one conveying technology element is directly or indirectly connected to an ingoing conveyor segment of another conveying technology element.

The proposed features result in a system of rules for directing conveyed objects which is very simple but nevertheless enables a high throughput. Specifically, a number of downstream release devices disposed downstream of said conveying technology element are OR-connected and are used as a means of releasing a holding device or a conveyed object. In other words, a conveyed object waiting at the holding device is conveyed onwards when another expected conveyed object passes one of the OR-connected release devices or when there is no preceding conveyed object. In principle, the latter applies to the first conveyed object of a sorting order, for example.

The expression "conveying technology element" as used in the context of the invention should be understood as meaning every device for conveying and/or manipulating conveyed objects which brings conveyor streams together and directs them onwards via an outgoing conveyor segment or a number of such segments. In particular, said conveying technology element might also be termed a node via which the conveyor streams are directed. Specific examples of such conveying technology elements are all types of infeed systems, junctions of auxiliary conveyor lines into a main conveyor line and turntables, but also robots used for retrieving conveyed objects from stores, such as rack serving devices and autonomous conveyor vehicles ("shuttles") and vertical conveyors such as lifts and paternosters, for example. All of these elements are able to concentrate conveyor streams from a number of ingoing conveyor segments at a node. In the case of lifts and paternosters, conveyor streams from several levels are concentrated in a few conveyor streams (usually in lower levels). A rack serving device may be understood as meaning a conveytechnology element which concentrates conveyor streams from a large number of storage places in (what is usually) an outgoing conveyor stream.

The "conveyor segments" may generally also be construed as logical conveyor segments and need not necessarily be regarded as purely physical. For example, a rack serving device may be regarded as a v-to-w multiplexer where v specifies the number of storage places covered by the rack serving device and w specifies the number of objects transported simultaneously by the rack serving device. Although in physical terms the rack serving device is only a single device, it can nevertheless be regarded as a logical node having v ingoing conveyor segments and w outgoing conveyor segments.

The expression "holding device" as used in the context of the invention should be understood as meaning any element for holding a conveyor stream. For example, it includes barriers that can be pushed or pivoted into the conveyor stream. However, a holding device might also be conveyor belts, conveyor chains, conveyor rollers and such like, which can be halted (rather than being just loosely mounted). These conveyor means are used both for conveying and for holding conveyed objects as a rule.

Within the context of the invention, it would be conceivable both for all of the ingoing conveyor segments to be assigned a holding device each and for only some of the ingoing conveyor segments of a conveying technology element to be assigned a holding device each. In particular, all the ingoing conveyor segments are assigned a holding device each except for one.

The expression "release device" as used in the context of the invention should be construed as meaning all sensors and reading devices which are capable of identifying a conveyed object. For example, these might be barcode reading devices, RFID reading devices (Radio Frequency Identification) as well as video cameras. Also included, however, are sensors for measuring a physical property of a conveyed object, such as, for example, length, weight, color and such like, used as a release device, especially if various physical properties are measured with a view to identifying a conveyed object. For example, this could be a combination of a specific range of values for an object length, a specific range of values for an object weight and a specific range of values for an object color.

The expression "OR-connection" should be broadly construed within the context of the invention and not restricted either to physical OR gates or to the specific use of OR program commands. Rather, the concept also includes any implementation which has an effect corresponding to an OR-connection even if this is achieved without using physical OR gates and/or OR program commands.

A certain degree of fuzziness in the order can be deliberately permitted with a view to obtaining a high throughput. For example, a conveyed object n can be released if one of the preceding conveyed objects n−1, n−2, n−3 or an even earlier preceding conveyed object passes one of the OR-connected release devices. Although this means that a permutation is possible within the set actual order and hence a variance from the desired order, it also means that the likelihood of blockages in a conveyor system is reduced and the throughput increased. If necessary, the conveyed objects may pass through another sorting stage prior to arriving at the destination in order to obtain an exact actual order. Due to the pre-sorting, however, this sorting stage can be kept small and therefore requires only a small amount of space.

"Downstream" in the context of the invention generally refers to locations disposed after a reference point in the conveying direction of the conveyed objects. As it is being conveyed, therefore, a conveyed object arrives firstly, in time, at said reference point and then at the locations or positions disposed downstream.

"Upstream" is the opposite of "downstream". As it is being conveyed, therefore, a conveyed object arrives firstly, in time, at locations or positions disposed upstream and then at said reference point.

"Conveying direction" refers to the direction in which the conveyed objects move on the conveyor system (during normal operation).

A conveyed object being moved (and in particular a number of conveyed objects being moved) forms/form a "conveyor flow" or "conveyor stream".

Advantageous embodiments and features of the invention may be found below in the dependent claims and in the description of the drawings.

It is of advantage if the holding device or the conveyed object waiting on it is released when a conveyed object immediately preceding said conveyed object in a sorting order passes one of the connected release devices. This enables an exact actual sorting order to be created because a conveyed object n is not released until the immediately or directly preceding conveyed object n−1 passes one of the OR-connected release devices.

It is also of advantage if a holding device or a conveyed object waiting on it is released when all of the conveyed objects preceding the waiting conveyed object in a sorting order have passed one of the connected release devices. This enables an exact actual sorting order to be created even more effectively. Additional sorting is then no longer necessary. For example, a list can be compiled on the conveying technology element in which all of the conveyed objects to be conveyed to predefined destinations are listed. Those conveyed objects that have passed one of the OR-connected release devices are marked on the list accordingly. For example, a flag can be set for this purpose. In this manner, a check can be run to ascertain whether a holding device should be released or not.

Generally speaking, conveying technology elements with different release strategies may also be used within a conveyor system. For example, conveying technology elements which release a conveyed object n when one of the preceding conveyed objects n−1 or n−2 passes the release devices, when the conveyed object n−1 passes the release devices or when all of the preceding conveyed objects have passed the release devices may be used simultaneously. In this manner, a certain degree of fuzziness can be allowed at neural points of a conveyor system so that the sorting criteria there are relaxed with a view to obtaining improved throughput. If necessary, the rules governing the release of a conveyed object may also be dynamically adapted during operation, for example by a higher-ranking controller.

It is of particular advantage if the signal of a release device disposed directly in an outgoing conveyor segment is also used to release the holding device or the conveyed object waiting on it. In this manner, a conveyed object is directed as rapidly as possible via the conveying technology element. As a result, throughput on the conveyor system as a whole is further increased.

Based on another advantageous variant of the method, several conveyed objects have the same order number in the sorting order. In this manner, it is possible to create several groups of conveyed objects in a sorting order within which the conveyed objects may be in any order. In other words, the conveyed objects do not have an unnecessary unique order number. For example, the sorting order may have several conveyed objects with the order number 3. These conveyed objects come after group 2 but before group 4 based on the proposed method. Within group 3, however, the order of the conveyed objects is random.

Based on another advantageous variant of the method, in order to create a sorting order for a destination to be supplied or several such sorting orders for several destinations to be supplied in a conveyor system having a number of conveying technology elements of said type, the at least one coupling for an outgoing conveyor segment of one conveying technology element is directly or indirectly connected to an ingoing conveyor segment of another conveying technology element, and several of the release devices logically connected to an OR-connection are respectively disposed after another conveying technology element of said type disposed downstream. In this manner, several release devices following different nodes of several networked or interlinked conveying technology elements are used to release a conveyed object. The throughput on the conveyor system can be even further increased as a result. "Directly" in the context above means that the coupling for an outgoing conveyor segment of one conveying technology element is connected to an ingoing conveyor segment of another conveying technology element without other elements connected in between and "indirectly" means the opposite. In particular, the other elements connected in between might be manipulators which split or fan out the conveyor stream, in other words at branches and such like, for example.

It is of particular advantage if the method steps assigned to the conveying technology elements with a view to controlling the holding devices—with the exception of reporting a conveyed object passing a release device—are implemented for each conveying technology element independently of the method steps of the other conveying technology elements. This enables communication and hence the cost of communication lines between conveying technology elements to be kept low.

It is also of particular advantage if a program logic for controlling the holding devices is of an identical configuration in all of the conveying technology elements and/or if the method steps for controlling the holding devices are implemented in an identical manner in all of the conveying technology elements. In this manner, the complexity involved in producing and/or programming the controller for a conveyor system overall is kept low because the latter is made up of a number of identical modules. Furthermore, the complexity involved in searching for any errors which might occur is also kept low.

Furthermore, also of advantage is a method for operating a conveyor system of said type having an upstream store with storage places for conveyed objects and the conveying technology element is provided in the form of a retrieving robot for the store. As mentioned above, such robots, which might be rack serving devices, autonomous conveyor vehicles ("shuttles"), lifts or paternosters, for example, concentrate conveyor streams from several ingoing conveyor segments in one node. For example, a rack serving device may be regarded as a v-to-w multiplexer and v specifies the number of storage places covered by the rack serving device and w specifies the number of objects simultaneously transported by the rack serving device.

Also of advantage is a method for operating a conveyor system of said type having an upstream store with storage places for conveyed objects, whereby conveyed objects are retrieved in order on the basis of destinations and with reference to a sorting order for a destination to be supplied. This means that conveyed objects for the destination having the lowest position in an order are retrieved first of all, after which the conveyed objects having the second lowest position are retrieved, etc. In addition, the conveyed objects for a specific destination are likewise retrieved in a specific order. If in the store in which retrieval is operated by means of a conveying technology element there are objects, for example conveyed objects 3 and 5 for destination A and conveyed objects 1 and 7 for destination B, the conveyed objects are retrieved based on the order of A3, A5, B1, B7. Based on this example, it is assumed that conveyed objects missing from the order (e.g. A1, A2, A4, B2, B3, etc.) are disposed in other stores where retrieval is operated using other conveying technology elements. In this manner, a high degree of order in terms of the conveyor stream available in the conveyor system as a whole can be achieved.

However, it is also of advantage if conveyed objects are placed in order on the basis of a sorting order for a destination to be supplied but are retrieved from the store chaotically or not necessarily in order in terms of destinations. Based on said example given above, this means that the conveyed objects can also be retrieved in the order B1, A3, A5, B7, for example, or also in the order B1, A3, B7, A5, for example. The fact that retrieval is not based on an order at the level of destinations means that throughput during retrieval can be increased, for example if transport distances during retrieval are minimized.

It is also of advantage if at least two conveying technology elements are directly or indirectly connected to one another in a ring-shaped arrangement and/or if at least a partial conveyor stream is directed via said conveying technology elements in a ring-shaped arrangement. In other words, a back-coupling is provided in the network of connected conveying technology elements. To this end, at least one outgoing conveyor segment of at least one conveying technology element is connected to at least one ingoing conveyor segment of at least one other conveying technology element disposed upstream. In this manner, the degree of order of the conveyed objects being transported in several runs can be increased and/or gaps in the order can be filled step by step.

At this stage, it should be pointed out that the terms "downstream" and "upstream" in connection with a ring-shaped partial stream can be used synonymously. However, the OR-connected release devices in a conveying technology element for releasing a holding device do not necessarily comprise only release devices disposed in the ring but may also comprise release devices disposed outside the ring which are thus clearly disposed downstream.

It is also of advantage if the conveyor stream is fanned out again after the coupling for the outgoing conveyor segment. In this manner, the outgoing conveyor stream can be directed to different areas of a conveyor system and/or to different destinations. It would also be conceivable for the outgoing conveyor stream to be back-coupled on conveying technology elements disposed upstream on a number of ingoing conveyor segments. For example, the conveyed objects can be back-coupled in a predefined sequence or alternatively on a chaotic basis on conveying technology elements disposed upstream on a number of ingoing conveyor segments, thereby enabling the degree of order within the conveyor stream to be increased bit by bit and/or also enabling gaps in the order to be filled.

Based on another advantageous variant of the method, the releases per unit of time are monitored by a higher-ranking controller and the holding device released is the one at which the conveyed object having the lowest order number is waiting if there is a drop below a threshold value for the releases per unit of time. This prevents a build-up of blockages on the conveyor system for longer periods of time due to inefficient ordering of the conveyed objects. Instead of releasing the conveyed object with the lowest order number, the release system may also be operated chaotically and/or randomly, for example. This variant of the method is advantageously combined with a ring-shaped back-coupling in the conveyor stream in order to increase the degree of order of the conveyed objects being transported on the conveyor system successively. It is also of advantage if the threshold value is adapted depending on the number of objects disposed on the conveyor system. In other words, the threshold value is increased if the number of objects being transported increases and vice versa. This prevents a decreasing number of releases caused by a lesser number of conveyed objects being transported from being misinterpreted as a blockage. For example, such a situation might occur when a picking order is being started or for example when it has almost been completed. In both cases, there are relatively few objects on the conveyor system because the majority of them are still in the store or have already been loaded into shipping containers. It is also of advantage if allowance is made for a temporary break in the removal of conveyed objects at a destination. Especially in the case of manual picking, the workflow is necessarily interrupted, for example when an employee takes a break or a toilet break. In this case, there may likewise be a decrease in releases per unit of time which is not caused by a blockage.

At this stage, it should be pointed out that the variants disclosed in connection with the inventive method and the advantages obtained as a result apply in the same way to the conveying technology element proposed by the invention respectively the conveyor system proposed by the invention and vice versa.

BRIEF DESCRIPTION OF THE DRAWINGS

To provide a clearer understanding, the invention will be described in more detail with reference to the appended drawings.

These are highly simplified, schematic diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Furthermore, individual features or combinations of features from the different embodiments illustrated and described may be construed as independent inventive solutions or solutions proposed by the invention in their own right.

DETAILED DESCRIPTION OF THE PREFERRED EMBODIMENTS

Figure 1:
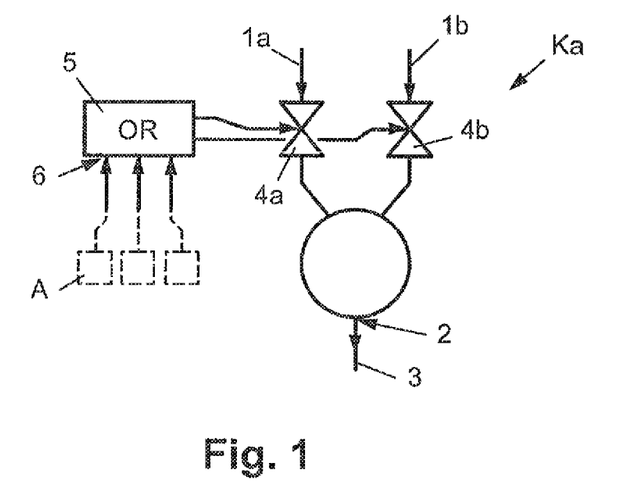
FIG. 1 a first schematically illustrated example of a conveying technology element.

FIG. 1 illustrates a first example of a conveying technology element Ka for combining conveyor streams. The conveying technology element Ka comprises two ingoing conveyor segments 1a, 1b, a coupling 2 for an outgoing conveyor segment 3 on which the ingoing conveyor segments 1a, 1b are brought together and a number of holding devices 4a, 4b for holding a conveyor flow on the ingoing conveyor segments 1a, 1b. Due to the combining effect, the conveying technology element Ka might also be called a node. The conveying technology element Ka further comprises a controller 5 having a number of inputs 6 logically connected to an OR-connection and which is connected to said holding devices 4a, 4b on the output side. On the input side, the controller 5 can be connected and/or is connected to a number (three in this instance) of release devices A disposed downstream of said ingoing conveyor segments 1a, 1b. The latter are merely indicated by broken lines in FIG. 1 because as a rule, they are disposed on a conveyor system (not illustrated in FIG. 1). The controller 5 is configured to release a holding device 4a, 4b and/or a conveyed object waiting on it when a conveyed object preceding said conveyed object in a sorting order passes one of said release devices A or when there is no preceding conveyed object.

In the example illustrated in FIG. 1, there are only two ingoing conveyor segments 1a, 1b. It would naturally also be conceivable for more than two ingoing conveyor segments 1a, 1b to be provided. Similarly, by contrast with the system illustrated in FIG. 1, it would also be conceivable to provide more than one coupling 2 and more than one outgoing conveyor segment 3. It would also be conceivable to provide a number of inputs 6 and/or release devices A other than three.

At this stage, it should also be pointed out that FIG. 1 is a purely symbolic diagram of the conveying technology element Ka. For example, the holding devices 4a, 4b are illustrated as valves. Naturally, this should not be construed as restrictive in any way and in effect, all elements for holding a conveyor stream may be used as holding devices 4a, 4b. For example, these include barriers or gates which can be pushed or pivoted into the conveyor stream. However, the holding devices 4a, 4b might also be conveyor belts, conveyor chains, conveyor rollers and such like, which can be halted. Since these conveyor means are usually used both for conveying and for holding conveyed objects, it is difficult or impossible to make a clear distinction between the holding devices 4a, 4b and the ingoing conveyor segments 1a, 1b in this instance. The ingoing conveyor segments 1a, 1b in this instance therefore fulfil a dual function.

It would also be conceivable—as opposed to the diagram in FIG. 1—that not all of the ingoing conveyor segments 1a, 1b are provided with a holding device 4a, 4b each. For example, holding device 4b can be dispensed with, in which case an ingoing object conveyed on the conveyor segment 1b is always conveyed onwards or is conveyed onwards as a priority.

Finally, it should also be noted that the OR-connection need not necessarily be provided as a dedicated logic gate but may also be provided in the form of a software algorithm which is run in a processor, for example.

Figure 2:
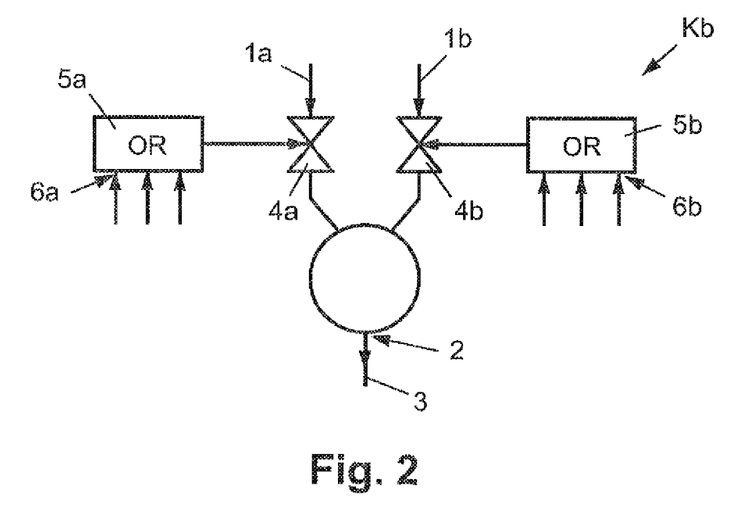
FIG. 2 the same as FIG. 1 but with an OR-connection each and a holding device each.

FIG. 2 illustrates another example of an embodiment of a conveying technology element Kb which is very similar to the conveying technology element Ka illustrated in FIG. 1. However, the difference is that every holding device 4a, 4b is provided with a separate OR-connection. In this manner, it is in principle possible to operate activation of the holding devices 4a, 4b by means of two algorithms running in parallel (and under certain circumstances independently of one another). It would also be conceivable to use different release devices A to activate the holding devices 4a, 4b.

Figure 3:
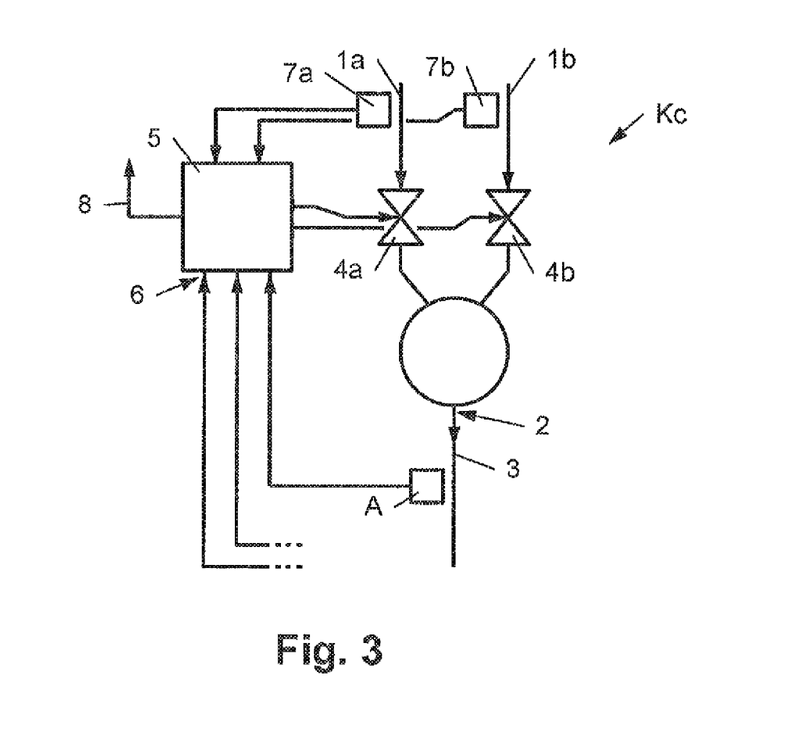
FIG. 3 another example of a conveying technology element having a controller with a broader range of functions.

FIG. 3 illustrates another example of a conveying technology element Kc, which in particular is intended to illustrate the fact that the controller 5 is not limited to the OR-connection but can also take over other tasks. To this end, the controller 5 in FIG. 3 is connected to sensors and/or reading devices 7a, 7b with the aid of which the ingoing objects conveyed on the conveyor segments 1a, 1b can be identified and the rank and/or position of which in a sorting order can be determined. Furthermore, as indicated by output line 8, said detection of an ingoing conveyed object can also be reported to conveying technology elements Kc disposed upstream and/or to a higher-ranking controller. This means that reading devices 7a, 7b can also operate as release devices A for conveying technology elements Kc disposed upstream.

Figure 4:
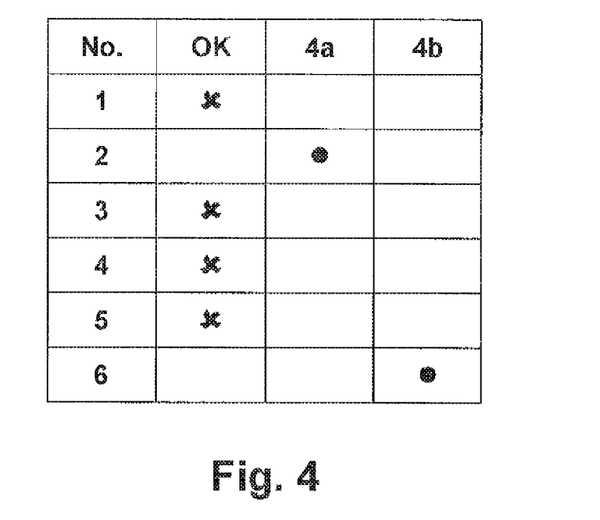
FIG. 4 an example of a table in which the objects that have passed a release device are listed.
Figure 5:
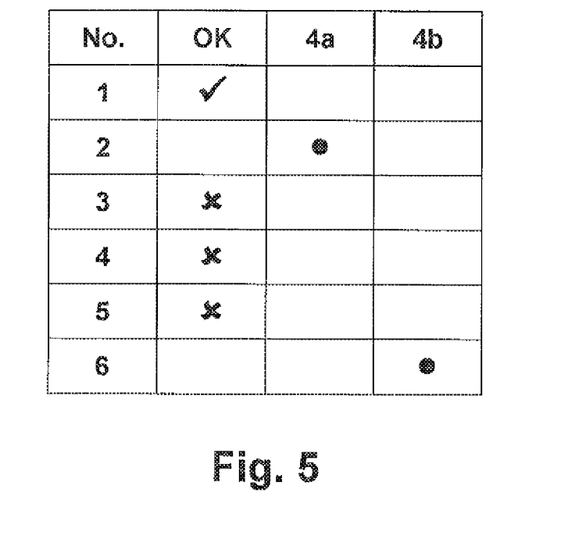
FIG. 5 the table from FIG. 4 at a second point in time.
Figure 6:
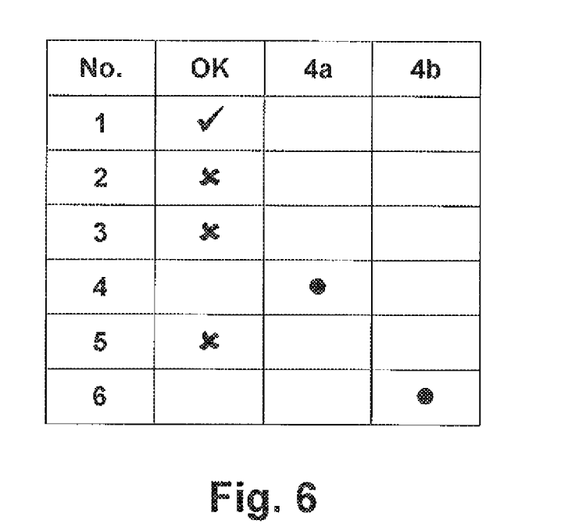
FIG. 6 the table from FIG. 4 at a third point in time.

FIGS. 4 to 6 are provided with a view to illustrating a simple example of how a holding device 4a, 4b respectively a waiting conveyed object can be released. For this purpose, a list is kept in the conveying technology element Ka . . . Kc, in which all the conveyed objects to be conveyed to predefined destinations are listed. For the sake of simplicity, a sorting order based on six conveyed objects which have to arrive in increasing order at a (single) destination will be described.

Based on the algorithm running in the conveying technology element Ka . . . Ke, a holding device 4a, 4b or the conveyed object waiting on it is released when a conveyed object immediately preceding said conveyed object in a sorting order passes one of the connected release devices A in this example. In other words, a conveyed object n is not released until the immediately or directly preceding conveyed object n−1 passes one of the OR-connected release devices A, as a result of which an accurate actual sorting order can be created at the destination in principle.

FIG. 4 illustrates a first point in time or status, at or in which conveyed object number 2 is waiting at the first holding device 4a and conveyed object number 6 is waiting at the second holding device 4b. None of the other conveyed objects, numbers 1, 3, 4 or 5, has yet passed one of the OR-connected release devices A. These are therefore marked by an "x" in the table.

At a second point in time illustrated in FIG. 5, conveyed object number 1 has passed one of the OR-connected release devices A and is marked by a tick in the table. Conveyed object number 2 waiting at the holding device 4a immediately after it is therefore released.

Similarly, FIG. 6 illustrates another point in time at which conveyed object number 2 has left the area of the conveying technology element Ka . . . Kc and conveyed object number 4 has moved into its place. Accordingly, conveyed object number 2 is shown in the list as being expected at the release devices A disposed downstream, in other words is marked by an "x". Naturally, it may also be marked by an "x" in the list from the outset.

In the example illustrated, another release triggered by conveyed object number 3 would then follow (namely for conveyed object number 4) or triggered by conveyed object number 5 (namely for conveyed object number 6).

As may be seen from FIGS. 4 to 6, a method of combining conveyor streams at a conveying technology element Ka . . . Kc is operated whereby a number of release devices A disposed downstream of the ingoing conveyor segments 1a, 1b and logically connected to an OR-connection are used to release a holding device 4a, 4b or a conveyed object, and a holding device 4a, 4b or a conveyed object waiting on it is released when a conveyed object preceding the waiting conveyed object in a sorting order passes one of the connected release devices A or there is no preceding conveyed object. The latter would apply to conveyed object number 1, for example. The proposed features result in a very simple set of rules for directing conveyed objects but one which nevertheless enables a high throughput to be obtained.

In the example described above, a conveyed object n is not released until the immediately preceding conveyed object n−1 passes one of the OR-connected release devices A. However, this is in no way the only conceivable option. Instead, it would also be conceivable to deliberately permit a certain degree of fuzziness in the sorting order with a view to obtaining a high throughput. For example, a conveyed object n can be released when one of the preceding conveyed objects n−1, n−2, n−3 or a preceding conveyed object even farther back passes one of the OR-connected release devices A. For example, it may be that the rules also allow conveyed object number 6 to be released by conveyed objects number 3 and 4. Although this means that a permutation is possible within the set actual order and hence a variance from the desired order, it also means that the likelihood of blockages in a conveyor system is reduced and the throughput increased.

It would also be conceivable for a holding device 4a, 4b or a conveyed object waiting on it to be released when all of the conveyed objects preceding the waiting conveyed object in a sorting order have passed one of the connected release devices A. This offers an even better possibility of obtaining an exact actual sorting order. Additional sorting is then no longer necessary. In the example described above, this means that conveyed object number 6 is not released until all of the other conveyed objects, numbers 1 to 5, have passed one of the OR-connected release devices A.

Another way of increasing throughput is to use the signal of a release device A disposed directly in an outgoing conveyor segment 3 to release the holding device 4a, 4b, as is the case with the example illustrated in FIG. 3. If conveyed objects number 3 and 5 were waiting at the holding devices 4a, 4b, the release of conveyed object number 2 would be immediately followed by the release of conveyed object number 3. In this manner, a conveyed object is directed as rapidly as possible via the conveying technology element and the throughput on the conveyor system increased.

By contrast with the example illustrated in FIGS. 4 to 6, it is also possible for several conveyed objects to have the same order number in the sorting order. In other words, it would be possible for several conveyed objects to be assigned the number 3. In this manner, it is possible to create groups of conveyed objects in a sorting order but within which the conveyed objects may have no order. Based on the proposed method, conveyed objects having number 3 are disposed after conveyed object number 2 but before conveyed object number 4. However, the specific ordering of conveyed objects number 3 is undefined. Such an approach is meaningful, for example, if the conveyed objects number 3 are of the same type (e.g. three identical drink bottles). This relaxation in the sorting system, which is not detrimental to the end result, can help to reduce the risk of blockages on a conveyor system and increase throughput.

Generally speaking, a "conveying technology element" can be understood as meaning any device for conveying and/or manipulating conveyed objects which brings conveyor streams together and directs them onwards via an outgoing conveyor segment or several such segments. FIGS. 1 to 3 illustrate this directly in the case of infeed systems, junctions of auxiliary conveyor lines with a main conveyor line and turntables, for example. However, conveying technology elements bringing conveyor streams together might also be provided in the form of robots for retrieving conveyed objects from a store, for example.

Figure 7:
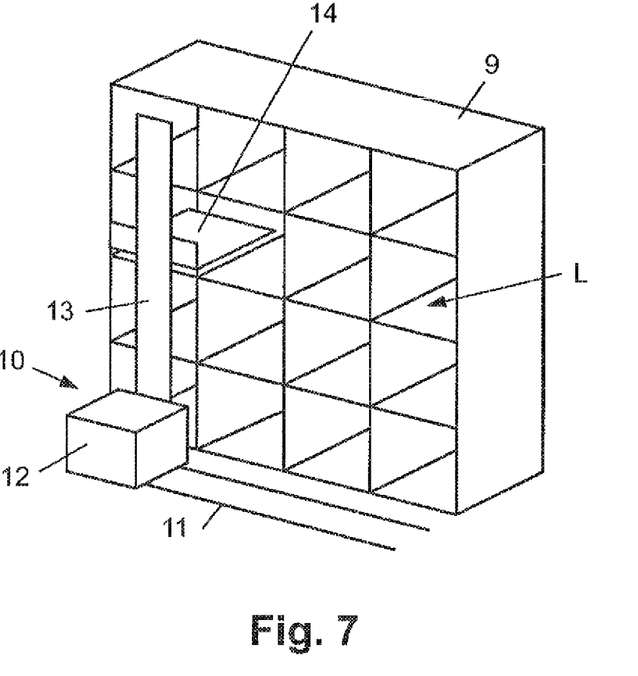
FIG. 7 an oblique view of a schematically illustrated store and rack serving device.

In this respect, FIG. 7 illustrates an example of a layout with a store 9 having a number of storage places L and a rack serving device 10 comprising a carriage 12 running on rails 11 with a lifting platform 14 which is vertically displaceable on a mast 13. The function of a rack serving device 10 is known per se and therefore requires no detailed explanation at this point.

Figure 8:
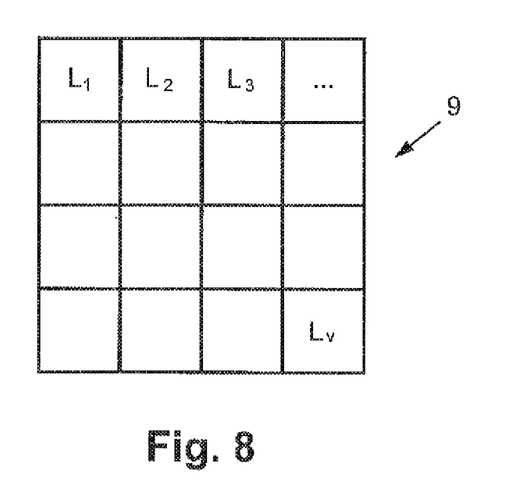
FIG. 8 a view in elevation of the store illustrated in FIG. 7.

FIG. 8 is a schematic view in elevation of the store 9 illustrating a possible numbering of the storage places L1 . . . Lv.

Figure 9:
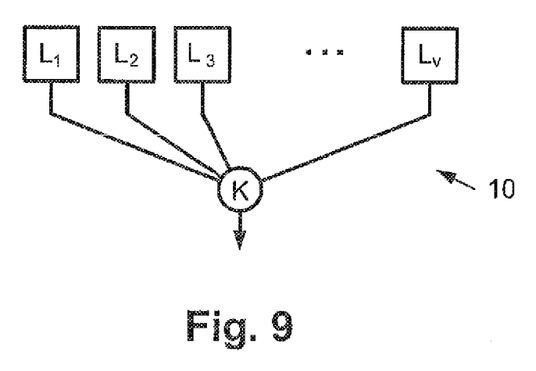
FIG. 9 a logical representation of the rack serving device illustrated in FIG. 7.

FIG. 9 shows a logical or symbolic representation of the rack serving device 10 illustrated in FIG. 7. As may be seen from FIG. 9, a number v of storage places L1 . . . Lv corresponding to the number of ingoing conveyor segments 2 is concentrated on an outgoing conveyor segment 3. The conveyor stream in this instance is concentrated by means of the lifting platform 14 which in this example is capable of accommodating only one conveyed object. The rack serving device 10 can therefore be regarded as a v-to-1 multiplexer.

Figure 10:
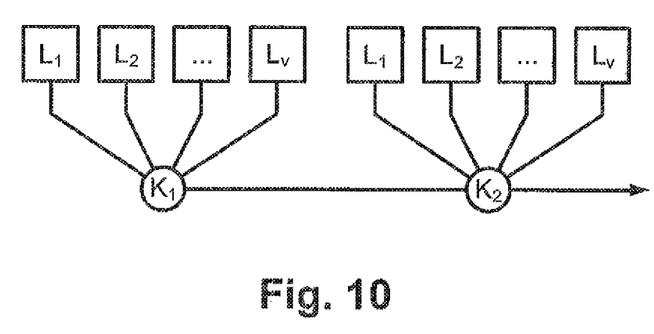
FIG. 10 a slightly different form of a rack serving device.

It would also be conceivable for the lifting platform 14 to be capable of accommodating several conveyed objects simultaneously. A logical representation of a rack serving device 10 with a lifting platform 14 accommodating two conveyed objects is illustrated in FIG. 10. Each of the standing places thus constitutes a logical node K1, K2. In this specific example, it is assumed that the conveyed objects will be transported off to the right. This means that the object disposed on node K1 cannot be transported away until the object transported via node K2 has left the lifting platform 14. For this reason, the output of node K1 is operated as an input to the node K2. Other arrangements whereby the conveyed objects can leave the lifting platform 14 simultaneously would naturally also be possible, in which case nodes K1, K2 are not linked in the manner illustrated here. Generally speaking, a rack serving device may be regarded as a v-to-w multiplexer where v denotes the number of storage places L1 . . . Lv covered by the rack sewing device 10 and w denotes the number of objects transported by the rack serving device 10 simultaneously or the number of standing places available on the lifting platform 14. In particular, FIGS. 9 and 10 also illustrate how the conveyor segments may also be generally regarded as logical conveyor segments and not necessarily purely physical objects. In the case of a v-to-1 rack serving device, there always "exists" only one ingoing conveyor segment 1a, 1b at any one point in time.

Figure 11:
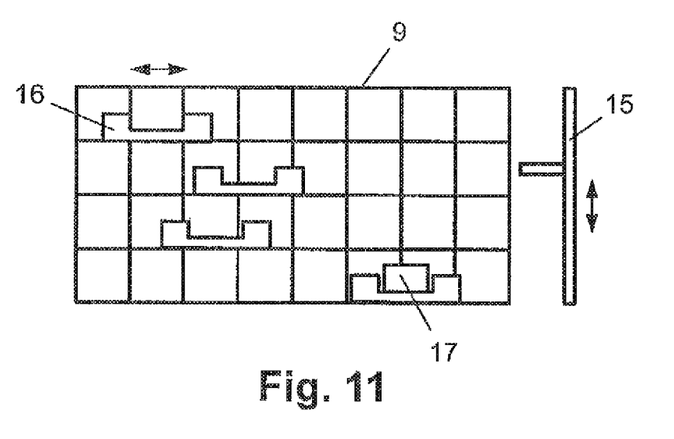
FIG. 11 a store with a lift connected to it and with conveyor vehicles travelling in it autonomously.

FIG. 11 illustrates another example of a layout comprising a store 9, a lift 15 disposed next to the store 9 and a number of conveyor vehicles 16 ("shuttles") operating autonomously on the individual store levels. Such a shuttle 16 removes a conveyed object 17 from a storage place L and transports it to the lift 15. The latter takes the object 17 and transports it to a forwarding conveyor line (not illustrated).

Figure 12:
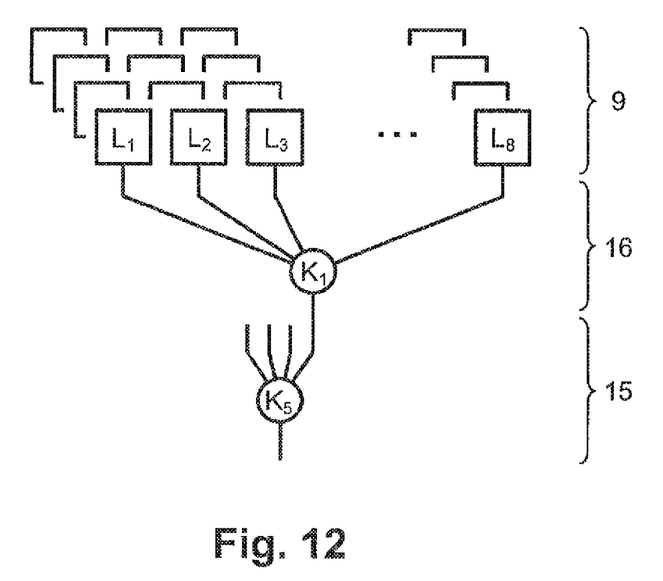
FIG. 12 a logical representation of the arrangement illustrated in FIG. 11.
Figure 13:
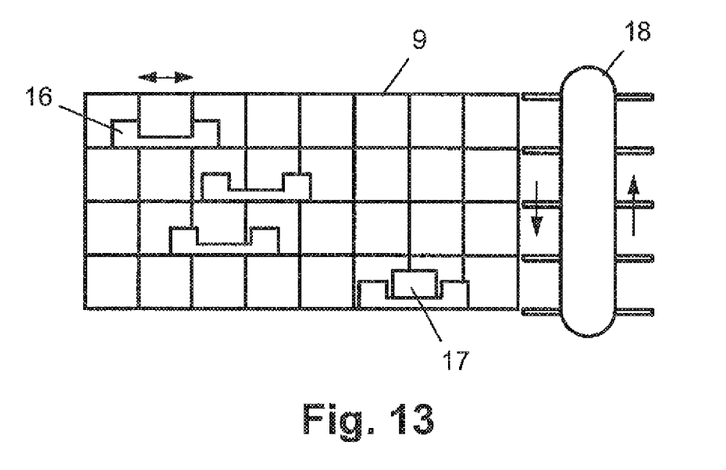
FIG. 13 the same as FIG. 11 but with a paternoster instead of the lift.

The logical structure resulting from the layout of FIG. 12 is illustrated in FIG. 13. In this instance, every shuttle 16 constitutes a node K1 . . . K4 to which the storage places L1 . . . L8 of a store row respectively lead. The outgoing conveyor segments 3 from nodes K1 . . . K4 in turn lead to node K5, which represents the lift 15.

FIG. 13 illustrates another layout with a store 9 and shuttles 16 which is very similar to the layout illustrated in FIG. 11. However, the difference is that a paternoster 18 is provided instead of the lift 15.

Figure 14:
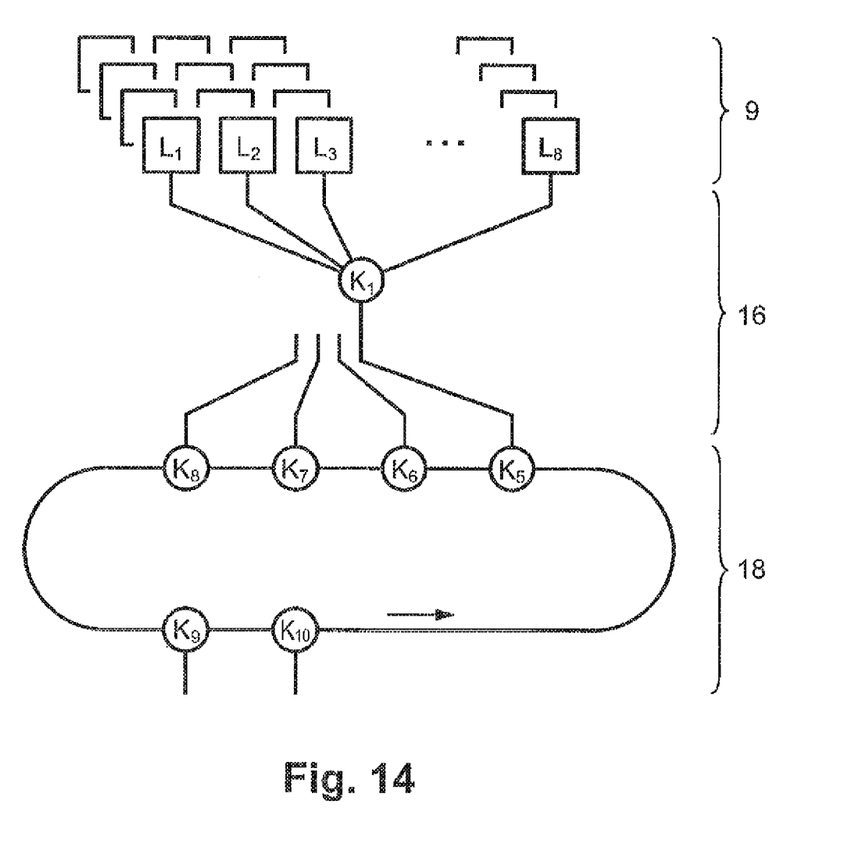
FIG. 14 a logical representation of the arrangement illustrated in FIG. 13.

FIG. 14 in turn shows a logical representation of the layout illustrated in FIG. 13. Given that the paternoster 18 is able to transport the conveyed objects 17 in a circle, it is represented as a loop in FIG. 14 and nodes K5 . . . K8 constitute the transfer point to the individual levels of the store 9 and nodes K9 and K10 constitute two discharge lines which may be disposed (physically) adjacent to one another or alternatively one above the other, for example.

Figure 15:
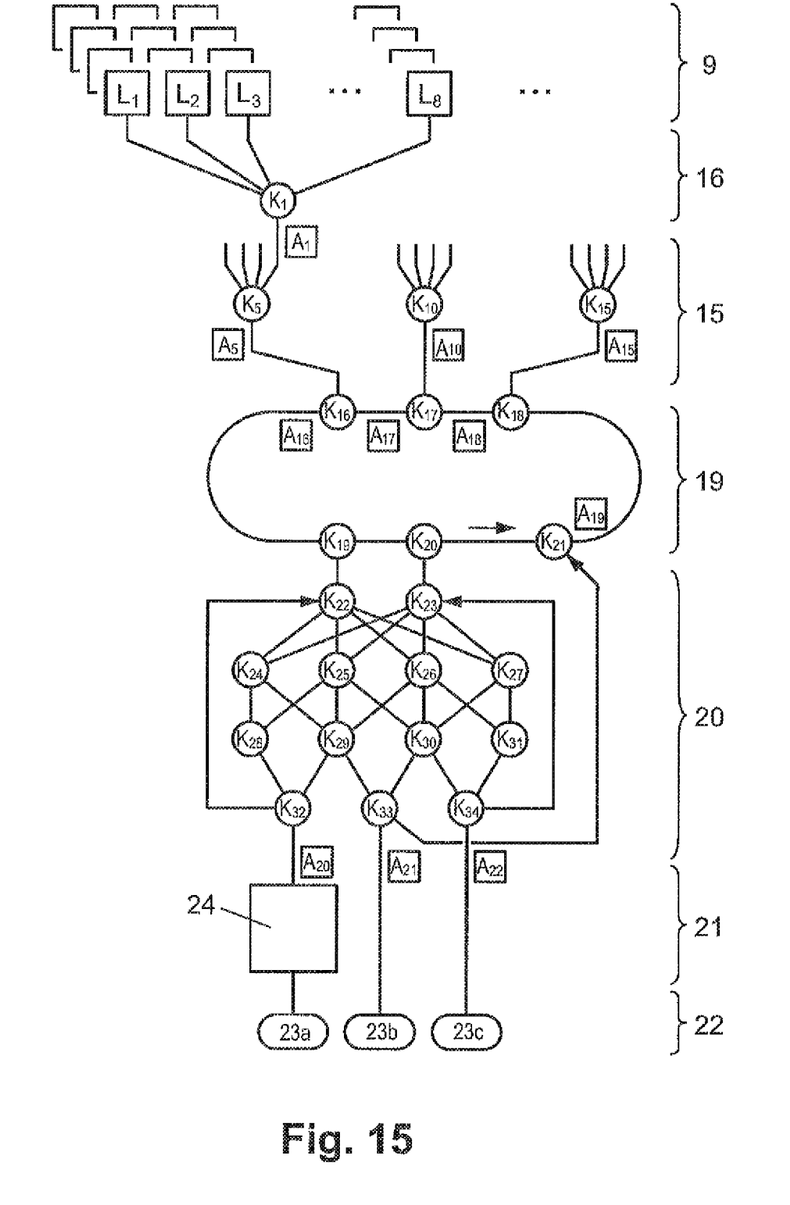
FIG. 15 an example of a slightly more complex conveyor system.

FIG. 15, finally, illustrates a slightly more complex example of a conveyor system. As was the case in FIGS. 9, 10, 12 and 14, a number of conveying technology elements Ka . . . Kc are coupled with one another in such a way that at least one coupling 2 for an outgoing conveyor segment 3 of one conveying technology element Ka . . . Kc is directly or indirectly connected to an ingoing conveyor segment 1a, 1b of another conveying technology element Ka . . . Kc. In this instance, a number of the release devices A logically connected to an OR-connection are disposed respectively downstream of another downstream conveying technology element Ka . . . Kc of said type. As with FIGS. 9, 10, 12 and 14 above, the conveying technology elements respectively nodes K1 . . . K34 are illustrated on a simplified basis only.

"Directly" in the above context means that the coupling 2 for an outgoing conveyor segment 3 of one conveying technology element Ka . . . Kc is connected to an ingoing conveyor segment 1a, 1b of another conveying technology element Ka . . . Kc without any other elements connected in between. For example, this relates to nodes K5 and K16 in FIG. 15. "Indirectly" means that other elements are connected in between, in particular branches and such like. For example, nodes K16 and K24 are connected indirectly because K19 and K22 are connected in between and operate as a fanning system.

Specifically, the layout illustrated in FIG. 15 comprises a store 9, a number of shuttles 16 operating autonomously therein and lifts 15 connected to the store 9. In this example, the store 9 has three rows of racking and aisles, and every row or racking has 32 storage places L which are arranged in four levels of eight storage places each. Accordingly, shuttles 16 represented by nodes K1 . . . K4 move in the first racking row, shuttles 16 represented by nodes K6 . . . K9 move in the second racking row and shuttles 16 represented by nodes K11 . . . K14 move in the third racking row. The lifts 15 are represented by nodes K5, K10 and K15.

Adjoining the lifts 15 is a horizontal loop 19 in which nodes K16 . . . K21 are disposed. The arrow indicates the conveying direction. Conveyed objects are transferred via nodes K19 and K20 from the loop 19 to a network 20 made up of a number of interlinked nodes K22 . . . K34. Adjoining the network 20 is an optional sorting area 21 and adjoining it a picking area 22. In the picking area 22, there are three destinations to be supplied 23*a* . . . 23*c*, for example work stations at which conveyed objects 17 are automatically or manually placed in shipping containers or loaded onto pallets. In the example illustrated in FIG. 15, a sorting stage 24 is disposed upstream of only one destination 23*a*. It would also be conceivable to provide a sorting stage 24 upstream of all destinations 23*a* . . . 23*c* in each case or alternatively to provide none at all. Finally, a number of release devices A1 . . . A22 are provided in the example illustrated in FIG. 15. For example, every shuttle 16 is assigned a release device A1 . . . A4, A6 . . . A9 and A11 . . . 14 on the holding platform. Every lift 15 is assigned a release device A5, A10 and A15 on the lifting platform.

It should expressly be pointed out that the layout of release devices A1 . . . A22 is purely an example intended to demonstrate the way in which the conveyor system illustrated in FIG. 15 operates and the layout may naturally also be different. In particular, it should be noted that in order to retain greater clarity in the drawing, none of the release devices in the network 20 are illustrated. In a real system, it would naturally also be possible to provide release devices at any point in the network 20. It should also be noted that interlinking networking of nodes K1 . . . K34 with the release devices A1 . . . A34 is also not explicitly indicated in FIG. 15 but would naturally be present in a real embodiment of the conveyor system.

For example, the release devices A5 and A16 may be connected to the inputs 6 of conveying technology element K1. The release devices A16 . . . A19 may be connected to conveying technology element K21, for example. Conveying technology element K24 may be connected to release devices in the network 20 that are not illustrated, and so on. In physical terms, the release devices A1 . . . A22 may be connected to the nodes K1 . . . K34 by hard wiring or wirelessly. For example, release devices A1 . . . A22 may be connected to nodes K1 . . . K34 by means of a bus system. A release device A1 . . . A22 may be connected to a node K1 . . . K34 due to the fact that the address of the relevant release device A1 . . . A22 is stored or marked in a memory of the node K1 . . . K34 so that it can be used for the OR-connection, for example. The connection can be established in the same manner in a wireless network.

In the example illustrated in FIG. 15, a number of conveying technology elements/nodes K1 . . . K34 are directly or indirectly connected to one another in a ring-shaped arrangement. Accordingly, at least one partial conveyor stream is directed in a ring via said conveying technology elements/nodes K1 . . . K34. In other words, a back-coupling is provided. For example, node K21 is connected to node K18, node K32 to node K22, node K34 to node K23 and node K33 to node K21 in a ring. In this manner, the degree of order of the conveyed objects 17 being transported can be increased in several passes and gaps in the order can be filled step by step. The terms "downstream" and "upstream" may be used synonymously in the case of such a ring-shaped partial stream. The back-couplings illustrated in FIG. 15 are given purely by way of example with a view to better demonstrating the options. Other ring-shaped connections would naturally also be possible.

FIG. 15 also illustrates the way in which the conveyor stream is fanned out, for example at nodes K22 . . . K31. Generally speaking, a fanning process may be used as a means of directing an outgoing conveyor stream to different areas of a conveyor system and/or to different destinations 23*a* . . . 23*c*. In this respect, a node K22 . . . K31 with several outgoing conveyor segments 3 may also be directed to a node K22 . . . K31 having only one outgoing conveyor segment 3 and then split up at a downstream node having several outgoing conveyor segments 3.

It is of advantage if the method steps assigned to the conveying technology elements K1 . . . K34 for controlling the holding devices 4*a*, 4*b* are implemented, for each conveying technology element K1 . . . K34, independently of the method steps of the other conveying technology elements K1 . . . K34—with the exception of reporting a conveyed object 17 passing a release device A1 . . . A22. This enables communication and hence the work involved in setting up communication lines between the conveying technology elements K1 . . . K34 to be kept to a minimum.

In this connection, it is also of advantage if a program logic for controlling the holding devices 4*a*, 4*b* is of an identical configuration in all the conveying technology elements K1 . . . K34 and if the method steps implemented with a view to controlling the holding devices 4*a*, 4*b* are implemented in an identical manner in all the conveying technology elements K1 . . . K34. In this manner, the work involved in setting up and programming control of a conveyor system overall can be kept to a minimum because this can be done on the basis of a number of identical modules. This also means that the work involved in finding any errors which might occur can also be minimized.

Generally speaking, it is also possible to use conveying technology elements K1 . . . K34 operating with different release strategies within a conveyor system. For example, conveying technology elements K1 . . . K15 may be configured to release a conveyed object n when one of the preceding conveyed objects n−1 or n−2 passes one of the OR-connected release devices A1 . . . A22, whereas the other conveying technology elements K16 . . . K34, for example, may be configured so that a conveyed object n is not released until the preceding conveyed object n−1 passes one of the OR-connected release devices A1 . . . A22. In this manner, a certain degree of fuzziness can be imparted to neural points of a conveyor system where the sorting criteria are relaxed with a view to improving throughput. The rules governing the release of a conveyed object 17 may optionally also be dynamically adapted during operation, for example by a higher-ranking controller.

In order to create a predefined sorting order, it is also of advantage if conveyed objects 17 are retrieved in order based on the destinations 23*a* . . . 23*c* and based on a sorting order for a destination 23*a* . . . 23*c* to be supplied. This means that conveyed objects 17 for the destination 23*a* . . . 23*c* with the lowest position in an order are retrieved first of all followed by the conveyed objects 17 with the second lowest position, etc. Furthermore, the conveyed objects for a specific destination 23*a* . . . 23*c* are also retrieved in order. If, for example, conveyed objects number 3 and number 5 for destination 23*a* and conveyed objects 1 and 7 for destination 23*b*, for example, are disposed in store 9 from which retrieval is operated by conveying technology elements K1 . . . K4, the conveyed objects will be retrieved in the order a3, a5, b1, b7. In this example, it is assumed that the conveyed objects 17 that are missing from the order (in other words e.g. a1, a2, a4, b2, b3, etc.) are disposed in other racking rows where retrieval is operated by other conveying technology elements K6 . . . K9, K11 . . . K14. In this manner, a high degree of order of the conveyor stream on the conveyor system can be achieved overall.

Alternatively however, it would also be conceivable for the conveyed objects 17 to be retrieved from the store 9 based on a sorting order for a destination 23a . . . 23c to be supplied but chaotically or randomly in terms of the destinations 23a . . . 23e. In the aforementioned example, this means that the conveyed objects 17 can be retrieved in the order b1, a3, a5, b7, for example, or alternatively in the order b1, a3, b7, a5, for example. Due to the unordered retrieval at the level of destinations, the throughput during retrieval can be increased, for example if transport distances of the conveying technology elements K1 . . . K15 during retrieval are minimized.

Prior to arriving at a destination 23a . . . 23c, the conveyed objects 17 may optionally pass through yet another sorting stage 24 in order to obtain an exact actual order, as is the case with destination 23a in FIG. 15. Due to the previous sorting, however, this sorting stage 24 can be kept small and therefore requires only a small amount of space.

In order to detect and/or remove blockages on the conveyor system, it may be in one advantageous embodiment that the releases of nodes K1 . . . K34 per unit of time are monitored by a higher-ranking controller and the holding device 4a, 4b at which the conveyed object 17 with the lowest order number is waiting is released when there is a drop below a threshold value for the releases per unit of time.

For example, if the value for releases per unit of time drops from a relatively constant value (e.g. 50 releases per minute) to a very low value or even zero, it can be assumed that there is a blockage on the conveyor system. This blockage can then be dealt with by a higher-ranking intervention. Instead of releasing the conveyed object 17 with the lowest order number, the releasing system may also be operated on a random basis.

It is also of advantage if the threshold value is adapted depending on the number of objects 17 disposed on the conveyor system. In other words, the threshold value is increased if the number of objects 17 being transported increases and vice versa. This prevents a decrease in the number of releases due to the fact that a lesser number of conveyed objects 17 are being transported from being misinterpreted as a blockage.

For example, such a situation can occur when a picking order is being started or when it has almost been completed, for example. In both cases, there will be relatively few objects 17 on the conveyor system precisely because the majority of them are still in the store 9 or have already been packed in shipping containers. It is also of advantage if allowance is made for a temporary break in the removal of conveyed objects 17 at a destination 23a . . . 23c. Especially in the case of manual picking, the workflow is necessarily interrupted, for example when an employee takes a break or a toilet break. In this case, there may likewise be a decrease in releases per unit of time which is not caused by a blockage.

In this connection, it is also of advantage if the operation of retrieving conveyed objects 17 from the store 9 is adapted as a function of the removal of conveyed objects 17 at the destination 23a . . . 23c. In other words, the number of conveyed objects 17 removed from the store 9 per unit of time is reduced if the number of conveyed objects 17 removed at the destination 23a . . . 23c per unit of time drops and vice versa.

The embodiments illustrated as examples represent possible variants of a conveying technology element Ka . . . Kc, K1 . . . K34 proposed by the invention respectively a conveyor system proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable embodiments which can be obtained by combining individual details of the different embodiments described and illustrated are also included within the protected scope.

In particular, it should be noted that in reality, the devices described may also comprise more components than those described.

For the sake of good order, finally, it should be pointed out that, in order to provide a clearer understanding of the structure of a conveying technology element Ka . . . Kc, K1 . . . K34 respectively a conveyor system proposed by the invention, it/they and its/their constituent parts are illustrated to a certain extent out of scale and/or on an enlarged scale and/or on a reduced scale.

The objective underlying the independent inventive solutions may be found in the description.

LIST OF REFERENCE NUMBERS 1a, 1b Ingoing conveyor segment
2 Coupling for outgoing conveyor segment
3 Outgoing conveyor segment
4a, 4b Holding device
5, 5a, 5b Controller
6, 6a, 6b Input
7 Sensor/reading device
8 Output line
9 Store
10 Rack serving device
11 Rails
12 Carriage
13 Mast
14 Lifting platform
15 Lift
16 Conveyor vehicle ("shuttle")
17 Conveyed object
18 Paternoster
19 Loop
20 Network
21 Sorting area
22 Picking area
23a . . . 23c Destination
24 Sorting stage
A, A1 . . . A22 Release device
Ka . . . Kc, K1 . . . K34 Conveying technology element/node
L, L1 . . . L8 Storage place

The invention claimed is:

1. A method for merging conveyor streams on a conveying element having a number of ingoing conveyor segments, at least one coupling to an outgoing conveyor segment on which the ingoing conveyor segments are merged, a number of conveyor flow retainers on the ingoing conveyor segments, and a number of logically OR-connected conveyor flow release sensors disposed downstream of said ingoing conveyor segments, the method comprising:
  causing an object to wait at a conveyor flow retainer;
  releasing the conveyor flow retainer and accordingly the
    object waiting at the conveyor flow retainer when an object preceding the waiting object in a sorting sequence passes one of the OR-connected conveyor flow release sensors or when there is no preceding object; and creating at least one sorting sequence for at least one destination to be supplied in a conveyor system having a number of conveying elements of said type, whereby the at least one coupling for an outgoing conveyor segment of one conveying element is directly or indirectly connected to an ingoing conveyor segment of another conveying element;

wherein a number of the logically OR-connected conveyor flow release sensors are each connected downstream of another downstream conveying element of said type.

2. The method according to claim 1, wherein the conveyor flow retainer and accordingly the object waiting at the conveyor flow retainer is released when an object directly preceding said object in a sorting sequence passes one of the OR-connected conveyor flow release sensors.

3. The method according to claim 2, wherein the conveyor flow retainer and accordingly the object waiting at the conveyor flow retainer is released when all objects preceding the waiting object in a sorting sequence have passed one of the OR-connected conveyor flow release sensors.

4. The method according to claim 1, wherein the signal of a conveyor flow release sensor disposed directly in an outgoing conveyor segment is also used to release the conveyor flow retainer and accordingly the object waiting at the conveyor flow retainer.

5. The method according to claim 1, wherein with the exception of reporting an object passing a conveyor flow release sensor, each conveying element is controlled by method steps for controlling the conveyor flow retainers independently of the other conveying elements.

6. The method according to claim 5, wherein the conveyor flow retainers are controlled in an identical manner in all of the conveying elements.

7. The method according to claim 1, further comprising operating the conveyor system, wherein the conveyor system has an upstream store with storage places for objects, and wherein the conveying element is provided in the form of a retrieving robot for the store.

8. The method according to claim 7, wherein the upstream store has the storage places for the objects, and wherein objects are retrieved in order on the basis of destinations and with reference to a sorting sequence for a destination to be supplied.

9. The method according to claim 6, wherein the upstream store has the storage places for the objects, and wherein objects are placed in sequence on the basis of a sorting sequence for a destination to be supplied but are retrieved from the store chaotically or not necessarily in sequence with regards to destinations.

10. The method according to claim 1, wherein at least one partial conveyor stream is directed via said conveying elements in a ring-shaped arrangement.

11. The method according to claim 1, wherein the conveyor stream is fanned out again after the coupling for the outgoing conveyor segment.

12. A conveyor system, comprising a number of conveying elements for merging conveyor steams, a conveying element of the number of conveying elements comprising:
a number of ingoing conveyor segments;
at least one coupling for an outgoing conveyor segment, on which the ingoing conveyor segments are merged; and
a number of conveyor flow retainers on the ingoing conveyor segments;
a number of conveyor flow release sensors disposed downstream of said ingoing conveyor segments; and
a controller having a number of logically OR-connected inputs and being connected to said conveyor flow release sensors on the input side and to conveyor flow retainers on the output side, wherein the controller is configured to release a conveyor flow retainer and accordingly an object waiting at the conveyor flow retainer when an object preceding said object in a sorting sequence passes one of said conveyor flow release sensors or when there is no preceding object; and
wherein at least one coupling for an outgoing conveyor segment of one conveying element is directly or indirectly connected to an ingoing conveyor segment of another conveying element.

13. The conveyor system according to claim 12, wherein a program logic for controlling the conveyor flow retainers is of an identical configuration in all of the conveying elements.

14. The conveyor system according to claim 12, wherein at least two conveying elements are directly or indirectly connected to one another in a ring-shaped arrangement.

15. A method for merging conveyor streams on a conveying element having a number of ingoing conveyor segments, at least one coupling to an outgoing conveyor segment on which the ingoing conveyor segments are merged, a number of conveyor flow retainers on the ingoing conveyor segments, and a number of logically OR-connected conveyor flow release sensors disposed downstream of said ingoing conveyor segments, the method comprising:
causing an object to wait at a conveyor flow retainer; and
releasing the conveyor flow retainer and accordingly the object waiting at the conveyor flow retainer when an object preceding the waiting object in a sorting sequence passes one of the OR-connected conveyor flow release sensors or when there is no preceding object;
wherein several objects have the same sequence number in the sorting sequence.

16. The method according to claim 15, wherein the conveyor flow retainer and accordingly the object waiting at the conveyor flow retainer is released when an object directly preceding said object in a sorting sequence passes one of the OR-connected conveyor flow release sensors.

17. The method according to claim 16, wherein a conveyor flow retainer and accordingly an object waiting at the conveyor flow retainer is released when all objects preceding the waiting object in a sorting sequence have passed one of the OR-connected conveyor flow release sensors.

18. The method according to claim 15, wherein the signal of a conveyor flow release sensor disposed directly in an outgoing conveyor segment is also used to release the conveyor flow retainer and accordingly the object waiting at the conveyor flow retainer.

19. The method according to claim 15, wherein at least one partial conveyor stream is directed via said conveying elements in a ring-shaped arrangement.

20. The method according to claim 15, wherein the conveyor stream is fanned out again after the coupling for the outgoing conveyor segment.

21. A method for merging conveyor streams on a conveying element having a number of ingoing conveyor segments, at least one coupling to an outgoing conveyor segment on which the ingoing conveyor segments are merged, a number of conveyor flow retainers on the ingoing conveyor segments, and a number of logically OR-connected conveyor flow release sensors disposed downstream of said ingoing conveyor segments, the method comprising:

causing an object to wait at a conveyor flow retainer; and     releasing the conveyor flow retainer and accordingly the object waiting at the conveyor flow retainer when an object preceding the waiting object in a sorting sequence passes one of the OR-connected conveyor flow release sensors or when there is no preceding object;

wherein the releases per unit of time are monitored by a higher-level controller and wherein that conveyor flow retainer is released, at which the object with the lowest sequence number is waiting, if the releases per unit of time drop below a threshold value.

\* \* \* \* \*